(12) United States Patent
Fulgosi (10) Patent No.: US 10,066,775 B2
(45) Date of Patent: Sep. 4, 2018

(54) CLOSURE FOR PRESSURIZED DUCTS

(71) Applicant: FULGOSI S.R.L., San Nicolo (PC) (IT)

(72) Inventor: Davide Fulgosi, San Nicolo (IT)

(73) Assignee: FULGOSI S.R.L., San Nicolo (PC) (IT)

( * ) Notice: Subject to any disclaimer, the term of this patent is extended or adjusted under 35 U.S.C. 154(b) by 0 days.

(21) Appl. No.: 15/352,675

(22) Filed: Nov. 16, 2016

(65) Prior Publication Data

US 2017/0138523 A1    May 18, 2017

(30) Foreign Application Priority Data

Nov. 16, 2015   (IT) .................. 102015000073034

(51) Int. Cl.
| | |
|---|---|
| *B65D 53/00* | (2006.01) |
| *F16L 55/10* | (2006.01) |
| *B65D 53/02* | (2006.01) |

(52) U.S. Cl.
CPC .......... *F16L 55/1018* (2013.01); *B65D 53/02* (2013.01)

(58) Field of Classification Search
CPC ...... F16L 55/10–55/1018; B65D 53/02; B65D 45/00–45/16; B65D 43/00
USPC ....... 220/240, 324, 263, 811, 252, 232, 823, 220/314, 228, 820, 843, 378; 49/477.1, 49/381; 52/20, 19
See application file for complete search history.

(56) References Cited

U.S. PATENT DOCUMENTS

| | | | |
|---|---|---|---|
| 4,239,124 A | 12/1980 | Inouye | |
| 5,465,862 A * | 11/1995 | Devlin | .................... B64F 1/362 16/278 |
| 6,244,457 B1 * | 6/2001 | Piotrowski | .............. F16K 13/10 220/203.03 |
| 7,341,161 B2 | 3/2008 | McGuire | |
| 7,658,570 B2 * | 2/2010 | Hill | ..................... E02D 29/1418 220/232 |

(Continued)

FOREIGN PATENT DOCUMENTS

| | | |
|---|---|---|
| EP | 1 843 065 A1 | 10/2007 |
| GB | 2479210 A | 10/2011 |

(Continued)

OTHER PUBLICATIONS

Italian Search Report, dated Jul. 5, 2016, from corresponding Italian application.

*Primary Examiner* — Kareen Thomas
(74) *Attorney, Agent, or Firm* — Young & Thompson (57) ABSTRACT

Disclosed is a closure for ducts or receptacles for pressurized fluids, including an annular supporting structure (10), which defines an opening (11) for accessing the duct or receptacle, and a hatch (30), connected in an articulated manner to the supporting structure (10), with the ability to move between a closed position and an open position, wherein the supporting structure (10) includes a sealing surface (13), characterized in that it includes a sealing element (20) that can be positioned in the opening (11), the sealing element (20) including an expansible portion (21) with an inner surface (24) facing the duct and an outer surface (23) facing the sealing surface (13), the expansible portion (21) being able to expand as a result of the pressure of the fluid that acts on the inner surface (24) so that the outer surface (24) is placed in contact with the sealing surface (13).

20 Claims, 7 Drawing Sheets

(56) References Cited

U.S. PATENT DOCUMENTS 8,070,009 B2 * 12/2011 McKenzie ............ B65D 90/10
105/377.05

FOREIGN PATENT DOCUMENTS

| WO | 02/097319 A1 | 12/2005 |
| WO | 2007/109795 A2 | 9/2007 |

* cited by examiner

CLOSURE FOR PRESSURIZED DUCTS

FIELD OF THE INVENTION

The invention concerns a closure for pressurized ducts or receptacles. In detail, the invention relates to a closure of the type adapted to allow access to the inside of said duct or receptacle.

BACKGROUND OF THE INVENTION

Pressurized ducts of medium and large size, for example for transporting pressurized fluids such as fuels (liquid or gaseous) or the like, are generally provided with one or more branches through which it is possible to access the inside of the duct. These branches define accesses that allow apparatus to be inserted into the duct to perform inspections, cleaning and/or maintenance operations.

Generally, these branches comprise a section of pipe, which connects on the lateral surface of the main duct, fitted on the free end of which is a closure that allows sealing of said section of pipe when the duct is filled with the pressurized fluid.

Known closures generally comprise an annular element, fitted to the free end of the pipe, which define an opening through which the duct can be accessed. Said opening can be closed hermetically by means of a movable hatch connected in an articulated manner to said annular element.

The seal of the closure is generally guaranteed by two abutment surfaces, obtained respectively on the hatch and on the annular element, between which a gasket is interposed.

This gasket, made of a resilient material such as rubber or the like, is generally housed in a seat obtained on the hatch or, at times, on the annular element.

Examples of closures for pressurized ducts thus structured are described in EP 1843065 B1, WO 02/097319 A1 and U.S. Pat. No. 7,341,161 B2.

However, these known closures can only be fitted to ducts in which the pressure of the fluid does not exceed values of around 500 bar.

In fact, above this threshold the pressurized fluid, which normally penetrates the gap between the two abutment surfaces, presses on the gasket, to such an extent as to deform it and thrust it toward the outside of the closure.

In these conditions, the gasket is therefore unable to contain the fluid, which can escape from the closure.

The higher the pressure of the fluid is, the more evident this phenomenon is.

In this context, the object of the present invention is to provide a closure for pressurized ducts or receptacles that solves the problems of the prior art described above.

It is therefore an object of the present invention to provide a closure that can guarantee seal even at pressures of the fluid greater than 1000 bar, for example up to 2000 bar.

Another object of the present invention is to provide a closure that is reliable and with parts that are not subject to wear and, therefore, which do not require frequent periodic maintenance.

A further object of the present invention is to provide a closure that is practical and easy to handle.

In addition to the above, an object of the present invention is also to provide a closure that is simple and inexpensive to produce.

These objects are achieved by a closure for ducts or receptacles for pressurized fluids, which comprises:

- a supporting structure, to be fitted to a free end of a section of a tubular element, which defines an opening for accessing the duct or receptacle, and,
- a hatch, connected in an articulated manner to said supporting structure, with the ability to move between a closed position and an open position.

The closure according to the invention can be fitted to ducts or receptacles intended to transport or contain pressurized fluids, such as fuels (liquid or gaseous), water or the like.

More in general, the closure of the invention can therefore be fitted to hollow bodies intended to contain a pressurized fluid, either static or moving.

Therefore, in the description below, the term "duct" or "pressurized duct" relates to a generic hollow body among those mentioned above.

At the opening thereof, the supporting structure is provided with an annular sealing surface that extends from the opening toward the tubular element, along a direction X.

The closure according to the invention comprises a sealing element that, when the closure is closed, is arranged in the opening.

Said sealing element comprises an expansible portion with an inner surface, which faces the duct, and an outer surface, facing the sealing surface of the supporting structure.

SUMMARY OF THE INVENTION

According to the invention, the expansible portion is configured so as to be able to deform as a result of the pressure of the fluid that acts on its inner surface so that the outer surface is thrust toward the sealing surface of the supporting structure.

Preferably, the expansible portion has a shape and a size substantially complementary to that of the sealing surface. More in detail, the expansible portion has a size that, when the sealing element is positioned in the opening and no pressurized fluid is present in the duct, the outer surface detaches from the sealing surface.

Preferably, the distance between said surfaces is a few hundredths or tenths of millimeter.

As a result of this, the sealing element can be positioned in the opening, or removed therefrom, without effort, when the hatch is open and said opening is accessible.

Instead, when pressurized fluid is present in the duct, the expansible portion expands until its outer face comes into contact with the sealing surface. Therefore, a contact area that prevents the fluid from passing toward the outside is created between the two surfaces.

According to a preferred aspect, the expansible portion comprises an annular wall on which the inner surface and the outer surface are obtained.

The thickness of the expansible portion, or more precisely of the annular wall, is preferably more or less constant.

In this way, when subjected to the pressure of the fluid, the expansible portion can expand in a substantially uniform manner in its direction of extension.

The contact pressure generated between the outer surface and the sealing surface is therefore more or less constant.

To guarantee a better seal of the closure, the sealing element can comprise a gasket that surrounds the expansible portion. Preferably, the gasket is housed in an annular seat obtained on the outer surface of the expansible portion.

Advantageously, the contact between the outer surface of the expansible portion and the sealing surface prevents the gasket from deforming or leaving its seat, as occurs in prior art closures.

According to another aspect of the invention, the sealing surface and the outer surface of the expansible portion have a cylindrical shape.

This shape makes it more practical and less costly to machine the sealing surface and the outer surface to obtain the aforesaid difference in size.

Alternatively, these surfaces can have a conical or truncated-cone shape. In this case, said surfaces are arranged so that their diameter decreases from the opening toward the duct, to facilitate positioning of the sealing element in the opening.

In another aspect of the invention, at least the expansible portion of the sealing element is made of metal. This material allows the sealing element to withstand very high pressures, for example even greater than 1000 bar, which are exerted on the inner surfaces exposed to the fluid.

Moreover, the sealing element produced in this way is subject to very limited wear, so that maintenance or replacement operations are not necessary, even after numerous opening and closing cycles of the hatch or after several years of use of the closure.

According to a variant of the invention, the sealing element can be separable from the hatch.

In this variant, the sealing element preferably also comprises a front wall. In practice, said front wall is arranged so as to close one side of the expansible portion.

When the hatch is in closed position, and the sealing element is positioned in the opening, said front wall is placed against an inner face of the hatch.

According to another aspect of the invention, said front wall can be provided with connection means for the connection of gripping means that allow the expansible element to be positioned in the opening or removed therefrom.

Said connection means, for example, can comprise a threaded hole into which a handgrip can be screwed.

In this variant, the hatch is preferably connected to the supporting structure so as to rotate about an axis parallel to the direction of extension of the sealing surface.

For example, the hatch can be pivoted on the supporting structure so that its inner face, during rotation, slides on a front abutment surface of the supporting structure.

This hinge is particularly simple and inexpensive to produce and practical to implement.

This configuration can be adopted as on said front abutment surface there are no gaskets or other sealing elements to guarantee sealing of the closure.

According to an aspect of the invention, in this variant the hatch can be provided, on at least one part of its outer perimeter, with a projecting locking profile. The supporting structure, in turn, can be provided with a stop element with a seat adapted to house said locking profile, when the hatch is rotated in closed position.

In another variant of the invention, the sealing element can instead be integral with the hatch.

In practice, in this variant the expansible portion is connected to an inner face of the hatch so that, when the hatch is closed, said expansible portion is placed in the opening of the supporting structure at the sealing surface.

The hatch, in this case, is preferably connected to the annular structure so as to be able to rotate about at least one axis perpendicular to the direction of extension of the sealing surface.

In other words, the hatch is hinged, directly or indirectly, to the supporting structure in the manner of a leaf door.

BRIEF DESCRIPTION OF THE DRAWINGS

Further characteristics and advantages of the present invention will become more apparent from the description of an example of a preferred embodiment of a closure for pressurized ducts, as illustrated in the accompanying figures, wherein.

DETAILED DESCRIPTION OF THE INVENTION

With reference to the accompanying FIGS. 1 to 4, the number 1 indicates as a whole a closure for ducts or receptacles for pressurized fluids, such as fuels, water or the like.

The closure 1 comprises a substantially annular supporting structure 10, which defines an opening 11 through which the inside of the pressurized duct can be accessed, directly or indirectly.

Generally, this supporting structure 10 is fitted, at a rear edge 12, to the end of a tubular element (not illustrated in the figure).

As a function of the context of use, the tubular element can be part of the duct or of the receptacle or can be another element communication therewith.

According to the invention, the seal of the closure 1 is guaranteed by a sealing element 20, adapted to cooperate with a sealing surface 13 obtained on the supporting structure 10.

This sealing element 20 can therefore be positioned in the opening 11 when it is necessary to seal the closure and, on the contrary, can be removed when it is necessary to open the closure to access the duct.

According to the invention, the sealing element 20 comprises an expansible portion 21 capable of expanding when subjected to the pressure of the fluid inside the duct.

In a preferred variant, the expansible portion 21 comprises an annular wall 22, with an outer surface 23 and an inner surface 24.

Preferably, the sealing element 20 also comprises a front wall 25 that closes, on one side, said annular wall 22.

Said front wall 25 has an outer face 29 on which a connection means is obtained.

This means allows the connection of gripping means, such as a handgrip or the like, to position the sealing element 20 on, or remove it from, the opening 11.

In the variant illustrated, said connection means comprises a threaded hole 29a.

To facilitate correct positioning of the sealing element 20 in the opening, this is provided with an abutment 18 that delimits the extension of the sealing surface 13.

This abutment acts as a stop for the free edge 22a of the annular wall 22 when the sealing element 20 is slid into the opening 11.

When the sealing element 20 is placed in the opening 11, the outer surface 23 of the expansible portion 21 is facing the sealing surface 13 of the supporting structure 10.

Said sealing surface 13 and said outer surface 23 preferably, but not exclusively, have a cylindrical shape.

As already mentioned, the inner surface 24, when the sealing element 20 is placed in the opening 11, is instead facing the duct.

Therefore, when the pressure in the duct reaches a given threshold, the expansible portion starts to expand radially until the outer surface 23 is in contact with the sealing surface 13.

For this purpose, the outer surface 23 of the expansible portion 21 has a shape substantially complementary to that of the sealing surface.

To minimize the expansion required to bring the two surfaces into contact, the distance between them, when the duct is at ambient pressure, is preferably between 2 mm and 0.01 mm.

For example, in the variant in which these surfaces have a cylindrical shape, the difference between their diameters is between 1 mm and 0.3 mm.

This also allows at least the expansible portion 21, or optionally the whole sealing element 20, to be made of metal or other materials characterized by a high elastic modulus.

The thickness of the annular wall 22, for a section or for the whole of its extension, is more or less constant. In this way, the radial expansion of the expansible portion 21 is substantially homogeneous along its direction of extension and, consequently, the contact pressure between the outer surface 23 and the sealing surface 13 is more or less constant.

In a preferred embodiment, the sealing element 20 is provided with a gasket 26 housed in a seat 27 obtained on the outer surface 23.

The gasket 26, when the expansible portion 21 is positioned in the opening 11, is pressed against the sealing surface 13 to increase the seal of the closure.

Preferably, the gasket is positioned at the free edge 22a of the annular wall 22.

According to the invention, the closure is also provided with a hatch 30 adapted to maintain the sealing element 20 in position when the pressurized fluid is present in the duct.

In fact, the pressure, acting also on the inner face 28 of the front wall 25, thrusts the sealing element 20 outward.

This thrust is typically greater than the friction force that is generated between the outer surface 23 and the sealing surface 13 and, therefore, without the hatch, it would push the sealing element 20 out of the opening 11.

More in detail, the hatch 30 is connected to the supporting structure 10 by means of a hinge that allows it to move from an open position, in which it is moved away from the opening 11, and a closed position, in which is positioned in front of said opening.

When the hatch 30 is in closed position, the outer face 29 of the front wall 25 is close to or in contact with an inner face 31 of said hatch 30.

In a preferred variant, the hatch 30 is pivoted on the supporting structure 10 so as to rotate about an axis R parallel to the direction of extension X of the sealing surface 13.

During rotation, this causes the inner face 31 of the hatch to slide in contact with, or against, a front abutment surface 14 of the supporting structure 10.

Said surfaces are therefore flat and preferably smooth.

A handle 37, connected to the hatch 30, allows this latter to be gripped to rotate it from the closed position to the open position, and vice versa.

According to the invention, the hatch 30 is also provided, on at least a part of its outer edge, with a locking profile 34 that projects from said edge.

This profile, when the hatch is in closed position, can be inserted into a seat 16 of a stop element 15.

This stop element 15 constrains the hatch 30 to translate along the direction X, opposing the thrust that the sealing element 20 can exert on the hatch 30 when pressurized fluid is present in the duct.

Another stop element 35 can be provided on the hatch 30 to engage, in a seat 36, a locking profile 17 projecting from an edge section of the supporting structure 10.

Figure 1:
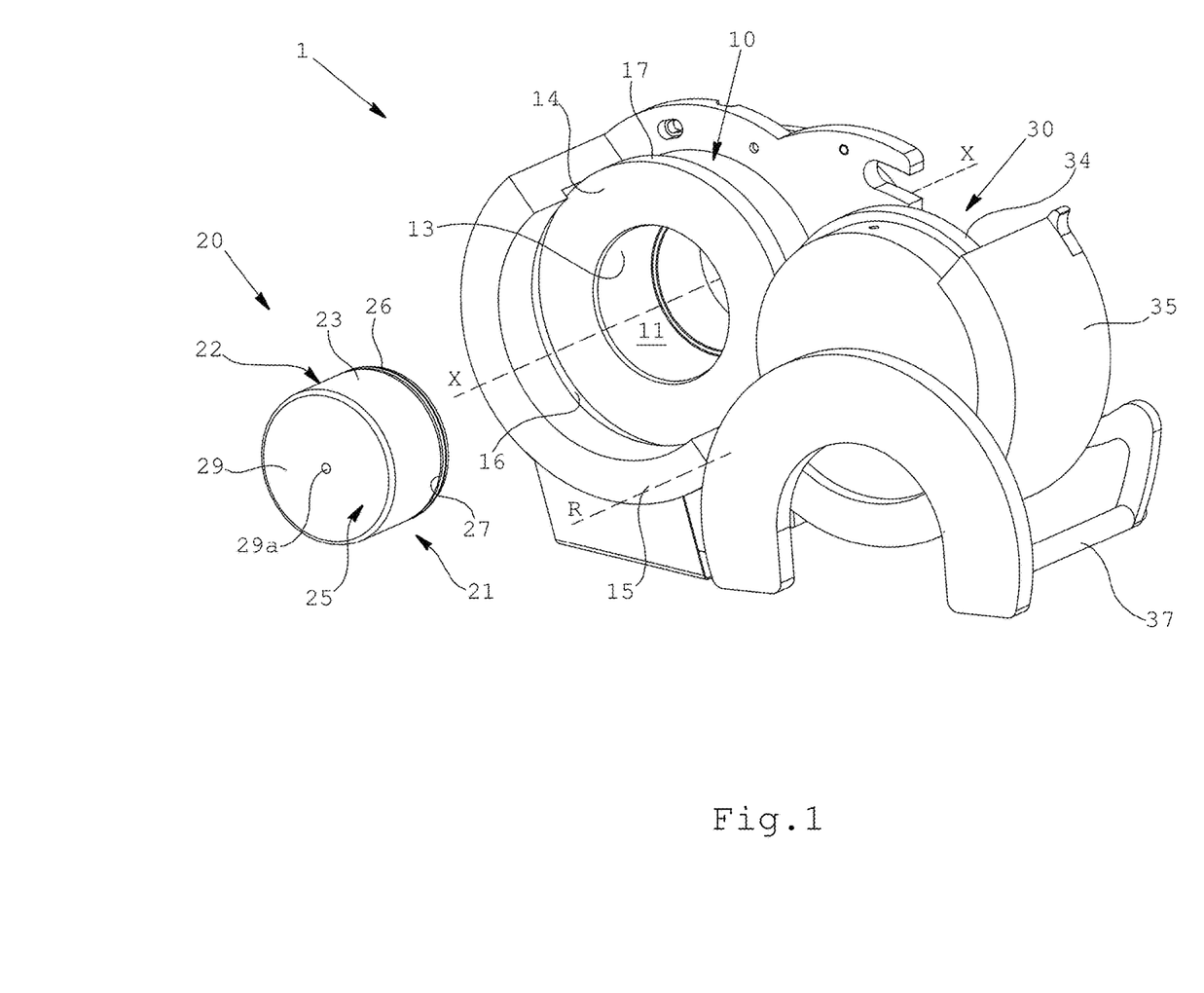
FIG. 1 is a perspective view of a closure according to the invention, in open position.
Figure 2:
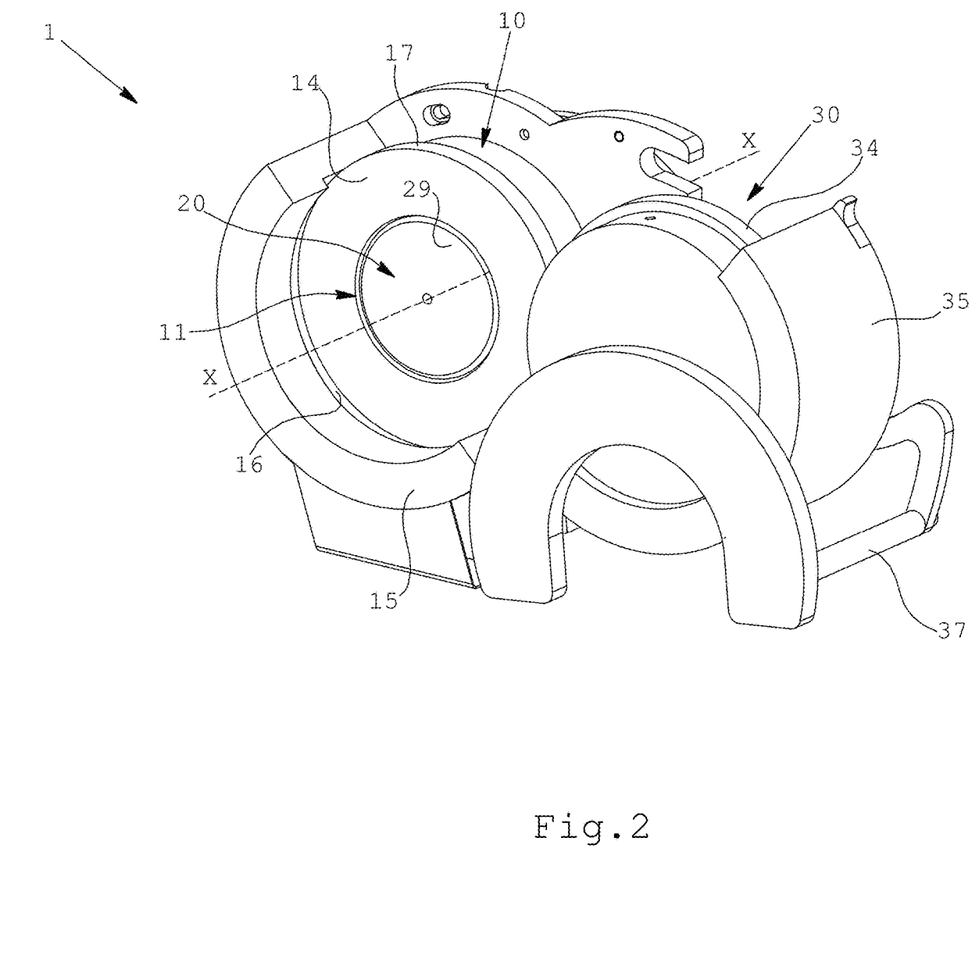
FIG. 2 is a perspective view of the closure of FIG. 1, in the closing phase, with the sealing element positioned in the opening.
Figure 3:
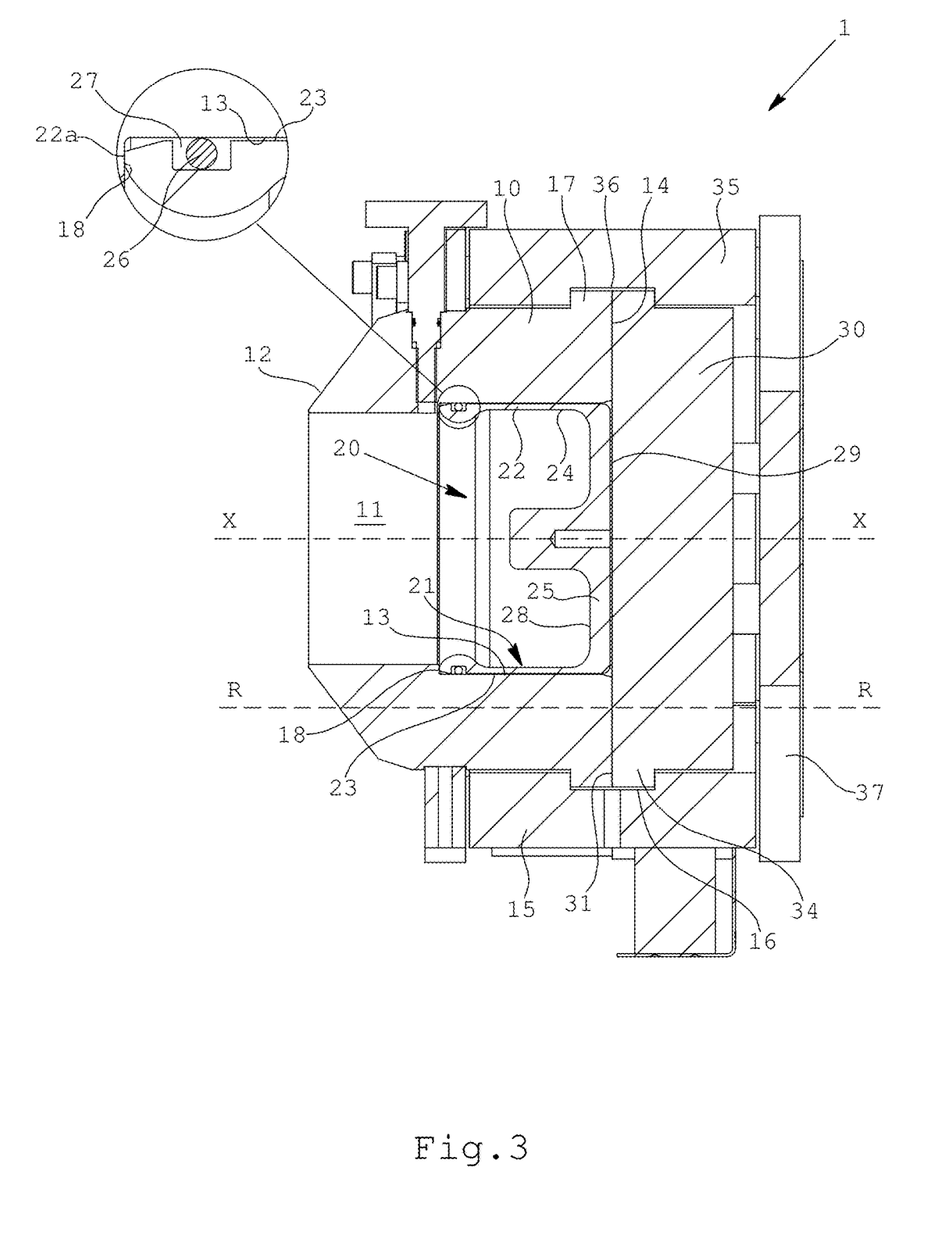
FIG. 3 is a sectional side view of the closure of FIG. 1, in closed position.
Figure 4:
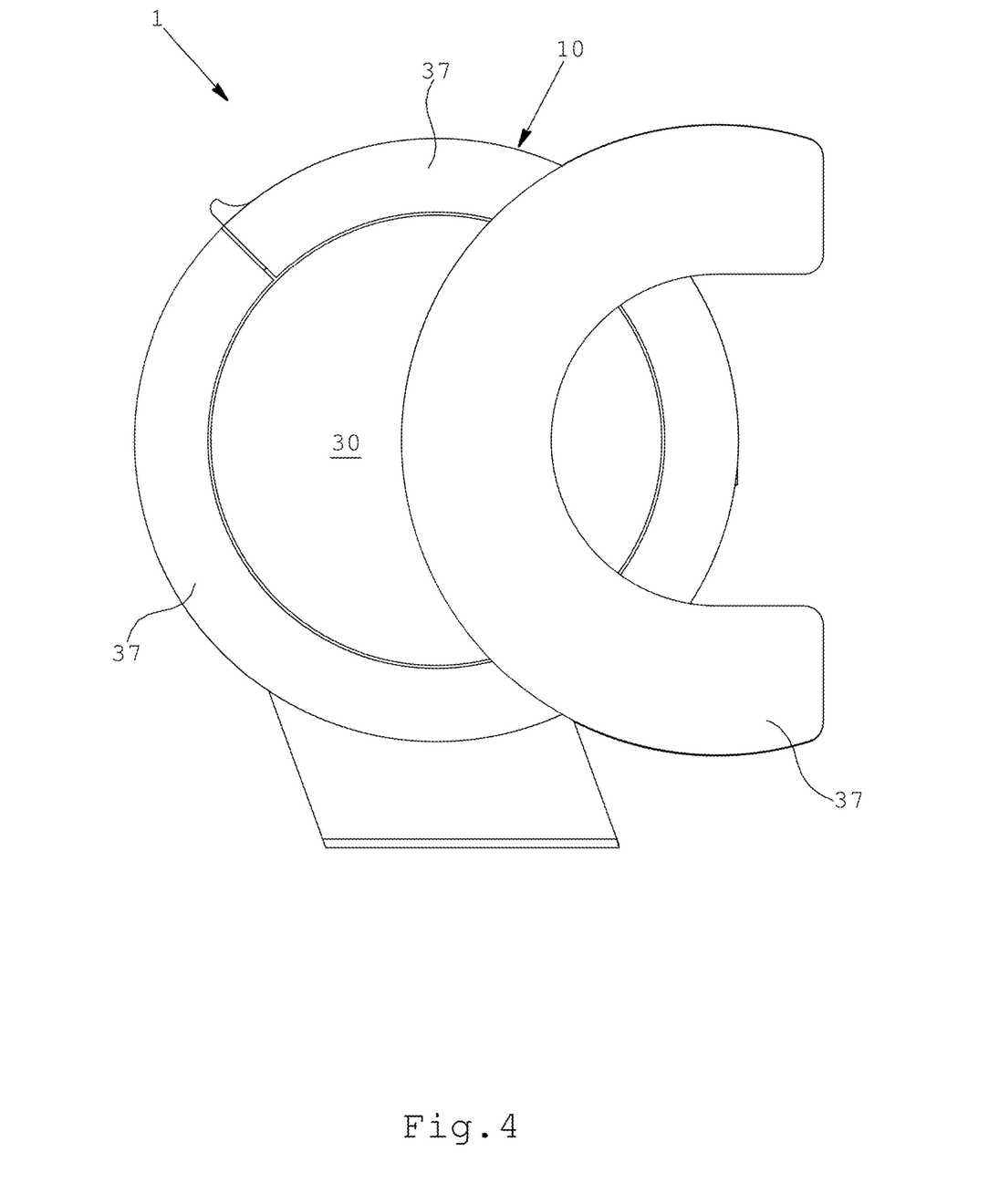
FIG. 4 is a front view of the closure of FIG. 1, in closed position.
Figure 5:
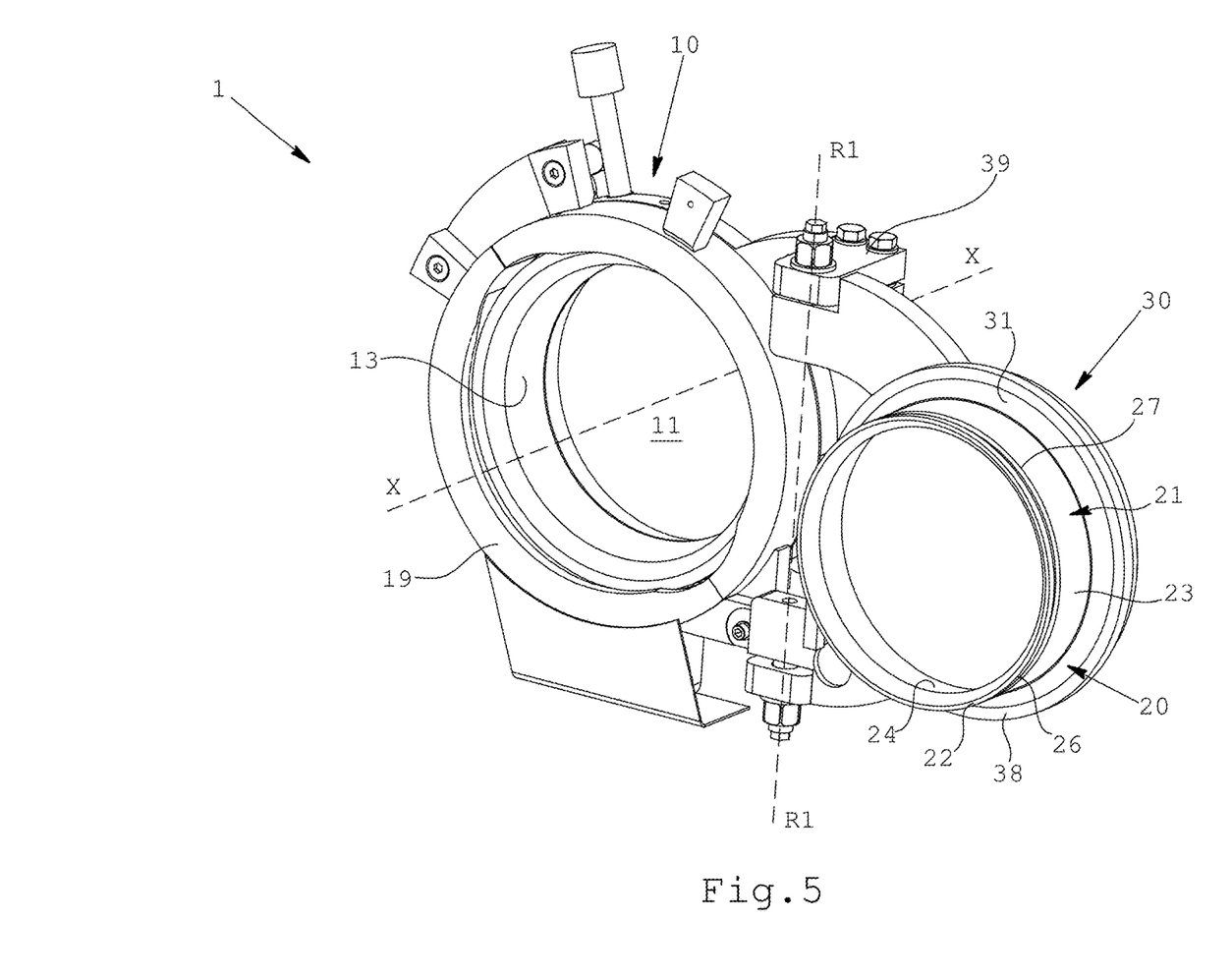
FIG. 5 is a perspective view of a closure according to another variant of the invention, in open position.
Figure 6:
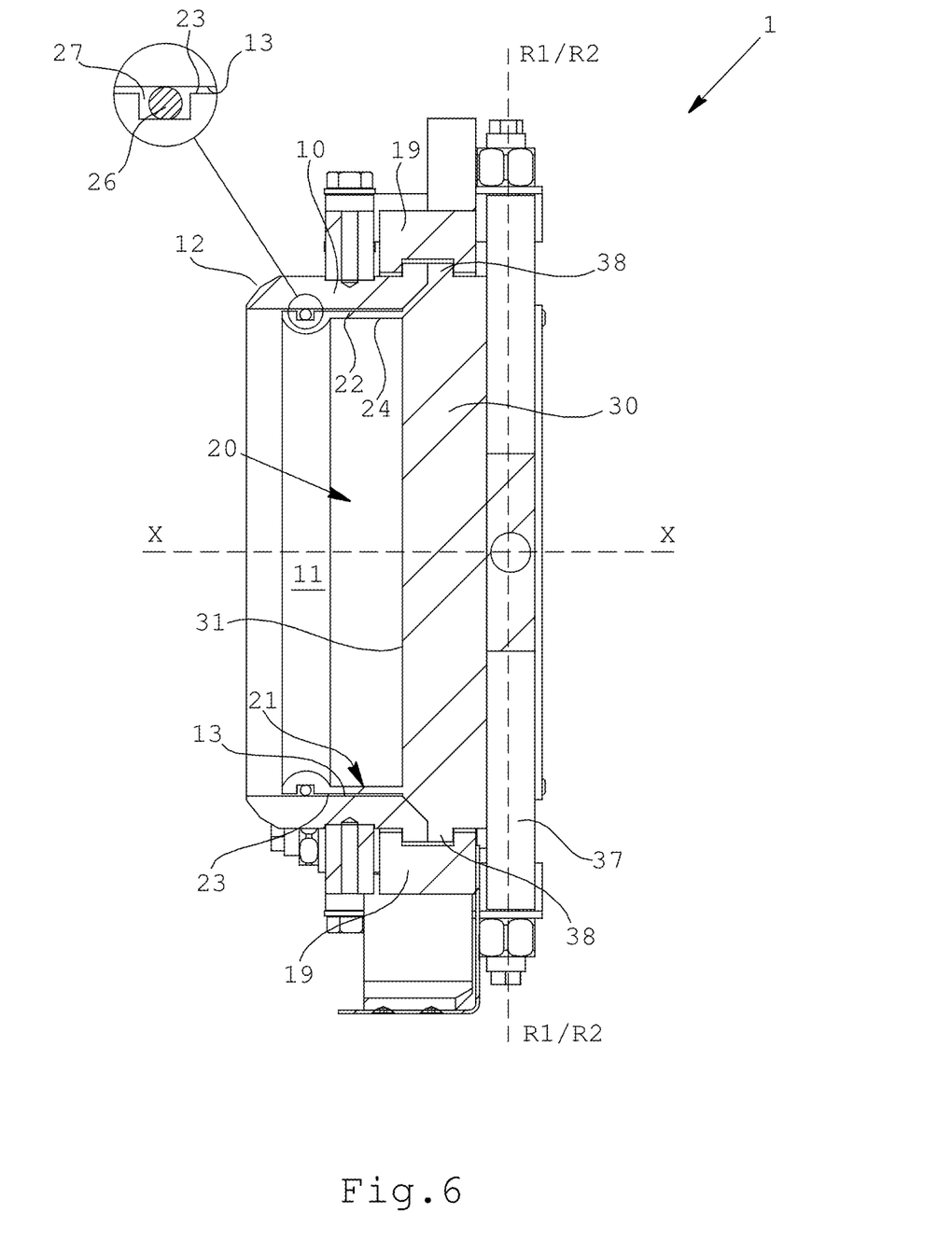
FIG. 6 is a sectional side view of the closure of FIG. 5, in closed position.
Figure 7:
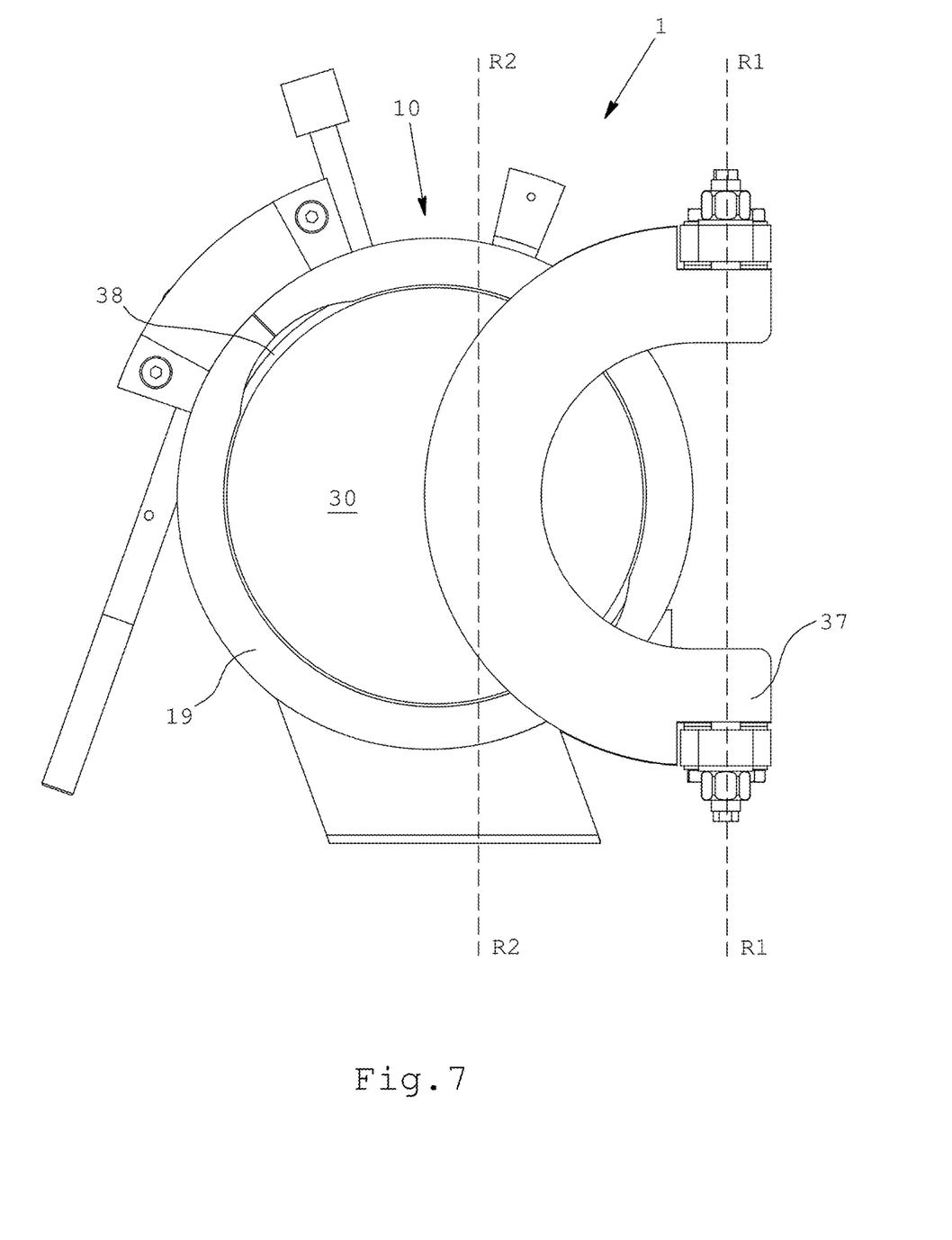
FIG. 7 is a front view of the closure of FIG. 5, in closed position.

FIGS. 5 to 7 illustrate another variant of the closure according to the invention.

In this variant, the sealing element 20 is integral with the hatch 30. The sealing element 20 is therefore moved together with the hatch 30 between the open position and closed position, in which is positioned in the opening 11.

More in detail, the annular wall 22 of the expansible portion 21 projects from the inner face 31 of the hatch 30. Therefore, the annular wall 22 is closed on one side.

The hatch 30 is connected to the supporting structure 10 so as to rotate about a first axis R1 perpendicular to the axis X of extension of the sealing surface 13.

For example, the hatch 30 is connected to the structure 10 by means of a hinge 39 of the type used for a leaf door.

Preferably, this hinge is provided with a second rotation axis R2, parallel to the first, which in the last section of the closing movement allows the hatch to translate along the direction X.

In the example of the figures, the sealing surface 13 and the outer surface 24 of the expansible portion 21 have a cylindrical shape.

In this variant, to facilitate insertion of the sealing element 20 into the opening 11, said surface can have a truncated-cone shape, with a diameter that decreases from the opening 11 toward the rear edge 12 of the supporting structure 10.

In this variant, locking of the hatch 30 is implemented by means of a jaw element 19 that, in the closed position, can be clamped about a locking profile 38 that projects from the outer edge of the hatch 30.

The invention has been described for illustrative and non-limiting purposes according to some preferred embodiments thereof. Those skilled in the art may find numerous other embodiments and variants, all falling within the scope of protection of the claims below.

The invention claimed is:

1. Closure for ducts or receptacles for pressurized fluids, comprising:
   an annular supporting structure (10), to be fitted to a free end of a section of a tubular body, which defines an opening (11) for accessing a duct or receptacle, and,
   a hatch (30), connected in an articulated manner to said supporting structure (10), enabling movement between a closed position and an open position;
   wherein said supporting structure (10) comprises a sealing surface (13) with a direction (X) of extension, the supporting structure comprising a sealing element (20) that can be positioned in the opening (11), said sealing element (20) comprising an expansible portion (21)

with an inner surface (24) and an outer surface (23) facing the sealing surface (13), said expansible portion (21) being able to expand as a result of pressure of the fluid that acts on the inner surface (24) so that the outer surface (24) is placed in contact with the sealing surface (13).

2. Closure according to claim 1, further comprising a gasket (26) housed in an annular seat (27) obtained on the outer surface (23) of the expansible portion (21).

3. Closure according to claim 1, wherein said expansible portion (21) comprises an annular wall (22) on which said internal surface (23) and said external surface (24) are obtained.

4. Closure according to claim 3, wherein said annular wall (22) has a constant thickness.

5. Closure according to claim 1, wherein the sealing surface (13) and the outer surface (24) have a cylindrical or truncated cone shape.

6. Closure according to claim 1, wherein at least the expansible portion (21) of the sealing element (20) made of metal.

7. Closure according to claim 1, wherein the sealing element (20) is integral with the hatch (30) or separable therefrom.

8. Closure according to claim 2, wherein said sealing element (20), when separable from the hatch (30), comprises a front wall (25) that, when the hatch (30) is in the closed position, is placed against an inner face (31) of said hatch (30).

9. Closure according to claim 8, wherein said front wall (25) is provided with a connection means (29a) for the connection of gripping means.

10. Closure according to claim 8, wherein the hatch (30) is connected to the supporting structure (10) with the ability to rotate about at least one axis (R) parallel to the direction (X) of extension of the sealing surface (13).

11. Closure according to claim 10, wherein the hatch (30) is provided, on at least one part of an outer edge, with a locking profile (34) that projects from said edge, the supporting structure (10) being provided with a stop element (15) with a seat (16) adapted to house said locking profile (34) when the hatch (30) is in the closed position.

12. Closure according to claim 2, wherein the hatch (30) when integral with the sealing element (20) is connected to the annular structure (10) so as to rotate about at least one axis (R1) perpendicular to the direction (X) of extension of the sealing surface (13).

13. Closure according to claim 2, wherein said expansible portion (21) comprises an annular wall (22) on which said internal surface (23) and said external surface (24) are obtained.

14. Closure according to claim 1, wherein the sealing surface (13) and the outer surface (24) have a cylindrical or truncated cone shape.

15. Closure according to claim 2, wherein the sealing surface (13) and the outer surface (24) have a cylindrical or truncated cone shape.

16. Closure according to claim 3, wherein the sealing surface (13) and the outer surface (24) have a cylindrical or truncated cone shape.

17. Closure according to claim 4, wherein the sealing surface (13) and the outer surface (24) have a cylindrical or truncated cone shape.

18. Closure according to claim 2, wherein at least the expansible portion (21) of the sealing element (20) is made of metal.

19. Closure according to claim 3, wherein at least the expansible portion (21) of the sealing element (20) is made of metal.

20. Closure according to claim 4, wherein at least the expansible portion (21) of the sealing element (20) is made of metal.

* * * * *